(12) United States Patent
Fujishiro et al.

(10) Patent No.: US 9,107,274 B2
(45) Date of Patent: Aug. 11, 2015

(54) COLOR DISPLAY ELEMENT MANUFACTURING METHOD AND COLOR DISPLAY ELEMENT

(75) Inventors: Koichi Fujishiro, Kisarazu (JP); Toshihide Itahara, Kisarazu (JP); Tohru Saito, Kisarazu (JP); Kazuhisa Urano, Kisarazu (JP); Shinsuke Iguchi, Chigasaki (JP); Kentaro Kumita, Sammu (JP); Tomoharu Takita, Sammu (JP)

(73) Assignee: NIPPON STEEL & SUMIKIN CHEMICAL CO., LTD., Tokyo (JP)

( * ) Notice: Subject to any disclaimer, the term of this patent is extended or adjusted under 35 U.S.C. 154(b) by 24 days.

(21) Appl. No.: 13/702,068

(22) PCT Filed: Jun. 6, 2011

(86) PCT No.: PCT/JP2011/062942
§ 371 (c)(1),
(2), (4) Date: Dec. 4, 2012

(87) PCT Pub. No.: WO2011/155446
PCT Pub. Date: Dec. 15, 2011

(65) Prior Publication Data
US 2013/0141777 A1 Jun. 6, 2013

(30) Foreign Application Priority Data

Jun. 7, 2010 (JP) ................................ 2010-130059

(51) Int. Cl.
*G02B 26/00* (2006.01)
*H05B 33/10* (2006.01)
(Continued)

(52) U.S. Cl.
CPC ............... *H05B 33/10* (2013.01); *G02B 5/201* (2013.01); *G02F 1/167* (2013.01); *G02F 2201/52* (2013.01)

(58) Field of Classification Search
USPC ......... 359/290–296, 237–240, 242, 245, 246, 359/250–252
See application file for complete search history.

(56) References Cited

U.S. PATENT DOCUMENTS

| 6,124,909 A | 9/2000 | Miyashita et al. |
| 7,006,277 B2 | 2/2006 | Mizuno |
| 2008/0067931 A1* | 3/2008 | Ito et al. ........................ 313/506 |

FOREIGN PATENT DOCUMENTS

| JP | 59-75205 A | 4/1984 |
| JP | 11-281815 A | 10/1999 |

(Continued)

OTHER PUBLICATIONS

English translation of JP 2009-271147.*
(Continued)

*Primary Examiner* — Scott J Sugarman
*Assistant Examiner* — Tamara Y Washington
(74) *Attorney, Agent, or Firm* — Cheng Law Group, PLLC (57) ABSTRACT

Provided is a color display element which employs a conventional system of monochrome electronic paper without degrading the degree of brightness and with ease and lower costs. Also provided is a method of producing a color display element including a pair of opposing substrates having electrodes, charged display bodies of white color and black color which are enclosed between the opposing substrates, and a color filter which is disposed on one of the opposing substrates, the method including forming a color filter disposed on a viewing side by forming, first, colored regions of at least three colors of blue, green, and red by an inkjet method on a transparent support substrate, and forming remaining regions other than the colored regions so as to be colorless or transparent.

7 Claims, 4 Drawing Sheets

(51) Int. Cl.
*G02B 5/20* (2006.01)
*G02F 1/167* (2006.01)

(56) References Cited

FOREIGN PATENT DOCUMENTS

| JP | 2001-350012 A | | 12/2001 |
|---|---|---|---|
| JP | 2003-161964 A | | 6/2003 |
| JP | 2004-361514 A | | 12/2004 |
| JP | 2006-267831 A | | 10/2006 |
| JP | 2008-83536 A | | 4/2008 |
| JP | 2009-271147 A | | 11/2009 |
| JP | 2009271147 A | * | 11/2009 |
| JP | 2009-282064 A | | 12/2009 |
| JP | 2010-54777 A | | 3/2010 |
| JP | 2010-122492 A | | 6/2010 |

OTHER PUBLICATIONS

International Search Report for the Application No. PCT/JP2011/062942 mailed Jul. 26, 2011.
International Preliminary Report on Patentability for Application No. PCT/JP2011/062942 mailed Jan. 17, 2013.
The First Office Action for the Application No. 201180028062.8 from The State Intellectual Property Office of the People's Republic of China Nov. 5, 2014.

* cited by examiner

×50 LENS (b) G1

×50 LENS (c) B1

×50 LENS

COLOR DISPLAY ELEMENT MANUFACTURING METHOD AND COLOR DISPLAY ELEMENT

TECHNICAL FIELD

The present invention relates to a display element, and more specifically, to an element configuration of a reflection type color display, and to a display element applied to an electronic paper.

BACKGROUND ART

As an electronic medium which is an alternative to paper, an electronic paper is actively developed. Contrary to the conventional displays, such as a CRT and a liquid crystal display, necessary characteristics of the electronic paper include being a reflection type display element, having a high white reflectance and a high contrast ratio, and, having a memory effect for display. The characteristics also include being capable of being driven under a low voltage, being thin and light, and being low in price. Specifically, as display characteristics, a white reflectance and a contrast ratio equivalent to those of paper are required. There is a great demand for colorization of the electronic paper because, as a matter of course, the conventional paper media display full color.

Among the technologies proposed so far, as electronic paper capable of performing color display, there has already been commercialized a medium in which a color filter is formed, for example, on a reflection type display element. However, this product uses a polarizing plate and therefore utilization efficiency of light is low, and only dark white color can be displayed. Further, because black color cannot be displayed, a contrast ratio is poor.

Moreover, there is an electrophoresis system based on a principle in which charged white particles as a bright reflection type display element and black particles are moved by electric fields. However, it is said that the scattering reflectance of the white particles in this system is a little less than 40% at most, and it is required to further improve the reflection efficiency. Further, when colorization is performed, the reflection efficiency is degraded, and hence bright color electronic paper is greatly desired.

For example, Patent Literature 1, Patent Literature 2, Patent Literature 3, and Patent Literature 4 disclose a reflection type color display medium in which color filters with electrophoretic elements are formed. If color filters having black matrixes, which are used in the conventional liquid crystal displays, or colored pixels are superposed on these reflection type color display medium, their brightness is deteriorated. Moreover, in Patent Literature 1, when a multicolor display element is realized, the colored pixels are formed by the same number of steps of photolithography system as the number of the colored layers, and hence the cost of steps and the colored resist are wastefully used.

On the other hand, in the method of producing a color filter by an inkjet method, red, blue, and green inks are ejected simultaneously only at respective necessary pixels and applied to regions where pixels are formed, and cured so as to form pixels. There has been proposed a method involving preliminarily forming partition walls by a photolithography step, and ejecting ink to a pixel portion (Patent Literature 5 and Patent Literature 6). In order to avoid blurring of each color region and mixture of colors between adjacent regions in this method, for example, Patent Literature 7 describes an example in which mixture of colors can be avoided when a static contact angle between the ink and the partition wall surface is 30 to 65°. This method decreases the cost of steps and the colored resist in comparison to the photolithography method described above.

Further, there has been proposed means for forming colored layers without forming a partition wall when producing a color filter by an inkjet method (Patent Literature 8). However, in this means, a black matrix layer is preliminarily formed as an undercoating, and a selective application of ink is performed by this region. Further, electronic paper is a reflection type display element and a black matrix is not needed.

CITATION LIST

Patent Literature

[PTL 1] JP 2003-161964 A
[PTL 2] JP 2004-361514 A
[PTL 3] JP 2008-83536 A
[PTL 4] JP 2006-267831 A
[PTL 5] JP 59-75205 A
[PTL 6] JP 2001-350012 A
[PTL 7] JP 11-281815 A
[PTL 8] JP 2010-54777 A

SUMMARY OF INVENTION

Technical Problem

The present invention has been made in view of the circumstances of the conventional technologies, and an object thereof is to provide a color display element which employs a conventional system of monochrome electronic paper, without degrading the degree of brightness and with ease and lower costs.

Solution to Problem

After conducting various studies in order to solve the above-mentioned problem, the inventors of the present invention have found that, in a color display element, a used amount of coloring ink can be suppressed to a required amount by minimizing regions which need to be colored, and by forming colored regions with an inkjet method as the means therefor, and that degradation of brightness can be suppressed by making the remaining regions colorless or transparent. Note that, a color filter, which is used in a conventional active liquid crystal display, needs to be exclusively provided with a black matrix for the purpose of shading for a thin film transistor (TFT) disposed at one of the opposing substrates. However, for electrophoresis type electronic paper which uses a micro capsule, for example, an entire surface of the opposing substrates is covered with black particles or white particles, and therefore light cannot travel from the viewing side to the opposite TFT. Accordingly, there is no need for a shading portion which corresponds to the black matrix. This is also true with a case in which, on the opposing substrate side, the TFT is covered exclusively with the white particles or a reflection mirror surface. Further, a passive display and a segment display do not include a TFT, and hence no shading portion is needed on the color filter side. Then, according to an inkjet method, to form the colored regions is advantageous also in view of the cost.

The present invention provides a multicolor display panel (element) in which display bodies including particles movable or rotatable by an application of an electric field are disposed between a pair of substrates, the color display element including a color filter in which colored regions of at least three colors of blue, green, and red are formed on at least one transparent substrate of the above-mentioned pair of substrates.

That is, an outline of the present invention is as follows.

(1) A method of producing a color display element including a pair of opposing substrates having electrodes, charged display bodies of white color and black color which are enclosed between the opposing substrates, and a color filter which is disposed on one of the opposing substrates, the method including forming a color filter disposed on a viewing side by forming, first, colored regions of at least three colors of blue, green, and red by an inkjet method on a transparent support substrate, and forming remaining regions other than the colored regions so as to be colorless or transparent.

(2) A method of producing a color display element according to the above-mentioned item (1), in which the forming of the colored regions by the inkjet method includes providing ultraviolet curability to coloring inks, applying the coloring onto the transparent support substrate by the inkjet method, and performing at least ultraviolet exposure to the coloring inks after drying.

(3) A method of producing a color display element according to the above-mentioned item (1), in which one of the opposing substrates is a drive-side substrate on which pixel electrodes are formed in a given pattern, the colored regions are disposed at positions where the pixel electrodes are projected on the transparent support substrate side, and the colored regions are formed with an area ratio of 90% or less to the pixel electrodes.

(4) A reflection type color display element, which is obtained by the producing method according to any one of the above-mentioned items (1) to (3), the reflection type color display element including the color filter and being configured to optionally switch charged white particles and a black state in a micro capsule.

(5) A color display element according to the above-mentioned item (4), in which the transparent support substrate in the color filter is made of a transparent film.

Figure 1:
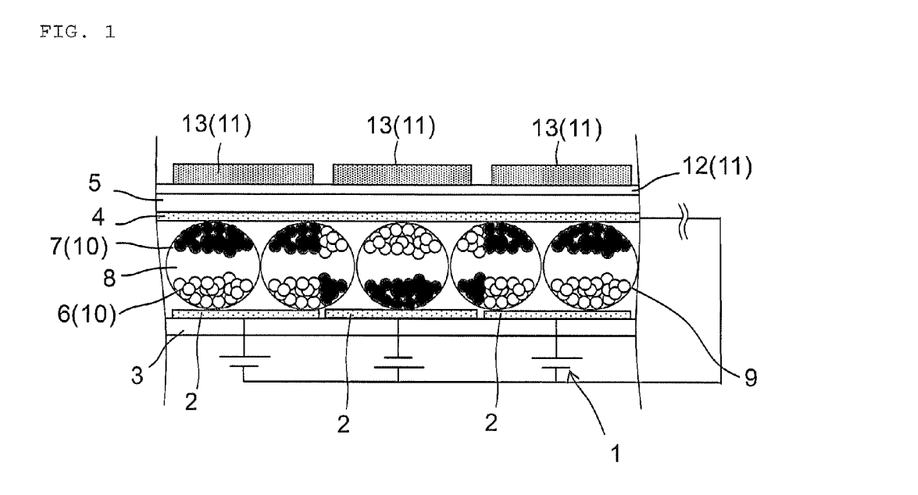
FIG. 1 A schematic cross-sectional (partial) view illustrating an example of a color display element of the present invention.

In such a multicolor display panel (color display panel), for example, the display bodies may be configured as micro capsules in which electrophoresis particles are enclosed under a state of being dispersed in dispersion media. Note that, a particle diameter of the micro capsule is preferably around 1 to 1,000 μm, and is normally dozens of micro meters. The black particles and the white particles in the micro capsules are electrically charged, and are sandwiched between the substrates having a pair of transparent electrodes, so as to perform monochrome display by being applied with an electric field (FIG. 1). That is, this color display element includes a drive-side substrate 3 on which drive electrodes 2 connected to pixel switches 1 such as thin film transistors (TFTs) are formed in a given pattern, and a transparent substrate 5 having an electrically conductive layer 4 such as ITO glass. Micro capsules 9 are disposed between these substrates. In this micro capsule 9, display bodies 10 made of white particles 6 and black particles 7, which are electrically charged with different electric charges from each other, are enclosed under a state of being dispersed in transparent dispersion media 8. Alternatively, for example, the display media may be formed with rotational particles each of which has surface regions of white color and black color, and the regions of the respective colors are electrically charged with different electric charges from each other.

Further, when producing a color filter 11, first, colored regions 13 are formed by an inkjet method on a transparent support substrate 12 which is made of a transparent film, glass, or the like. As a result, a partition wall as an undercoating for receiving ink in a conventional technology can be omitted, and further, the used amount of the coloring ink can be decreased, and a color filter can be formed with low costs. Here, a commercially available film, for example, a polycarbonate film, a PET film, and a COP film, can be used as the transparent film.

The inkjet ink for supplying liquid droplets for forming the colored regions 13 can be prepared by choosing publicly known materials as composition ingredients, and by adjusting the ink to proper physical properties described later, as long as the ink has insulation properties after the liquid droplets are dried and the liquid droplets can be continuously ejected from an inkjet head under a stable state.

In a general inkjet head using a piezo-electric element, the ink physical properties required for stably forming liquid droplets vary depending on head configurations. However, the viscosity under the temperature in the inside of the head is normally in the range of 3 mPa·sec to 150 mPa·sec, preferably, 4 mPa·sec to 30 mPa·sec. When the viscosity is higher than this range, ejection becomes impossible, and when the viscosity is lower than this range, the amount of ejection becomes unstable. The surface tension is in the range of 20 mN/m to 40 mN/m under the temperature in the inside of the head. When the surface tension is greater than this range, ejection of liquid droplets becomes impossible when starting an application of ink, and when the surface tension is smaller than this range, the amount of liquid droplets becomes unstable when performing continuous ejection. The temperature in the inside of the head depends on material stability, but the ink is normally used in the range of 20° C. to 45° C. Sometimes, the temperature is preferably set in a range of 35° C. to 45° C. in order to enhance the film thickness by increasing the solid content in the ink.

Figure 2:
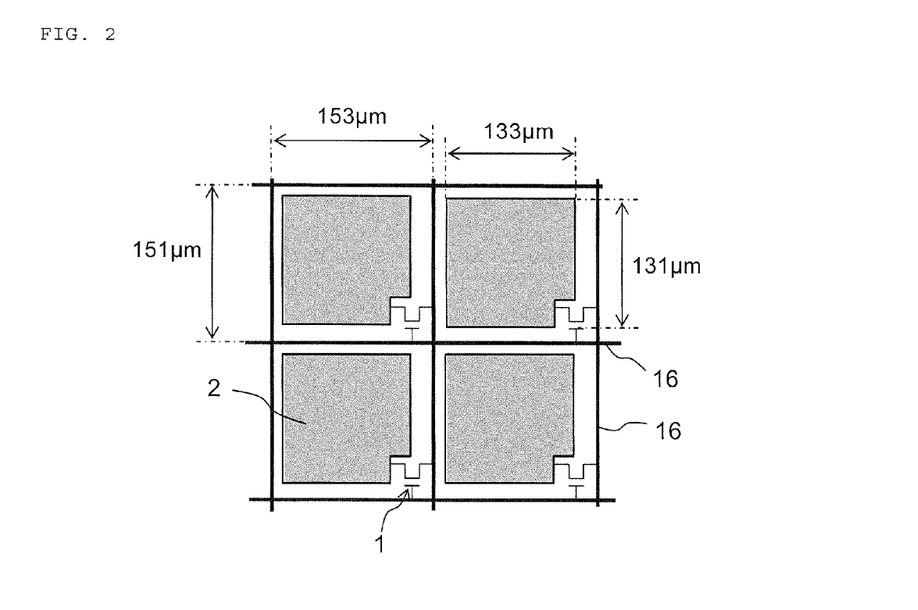
FIG. 2 A schematic plan view illustrating a state of a drive-side substrate including a TFT, of opposing substrates in the color display element.

At least three colors of blue, green, and red are selectively applied to the colored regions corresponding to the regions where the opposing pixel electrodes 2 on the drive-side substrate 3 are formed. Moreover, in order to enlarge the color reproducible region and enhance the brightness, regions of yellow, cyan, and transparent may be additionally formed. When manufacturing such a multicolor filter, an inkjet system is advantageous over a photolithography system because the development step can be omitted.

Moreover, in the present invention, when forming the colored regions by an inkjet method, it is a preferred mode that the area of the colored regions 13, where the color filter pixel portions are formed, is set to be smaller than the area of the pixel aperture portions corresponding to the pixel electrodes 2 on the opposing substrate (FIG. 2). That is, as illustrated in FIG. 2, the lattice unit, which is formed by a wiring 16 surrounding the pixel electrode 2 connected to the pixel switch (TFT) 1, is defined as one pixel unit. Then, the pixel electrode 2 is disposed in the pixel unit, and the pixel aperture portion is equal to the region where the charged particles, which constitute the display bodies, are moved by being applied with an electric field. Therefore, the portion which is substantially driven by the display bodies corresponds to the region of this pixel electrode 2. Accordingly, it is preferred that the colored region 13 on the color filter side be formed so as to correspond to the region of this pixel electrode 2, and also the colored region 13 be formed so as to have an area smaller than the area of this pixel electrode 2. It is more preferred that the colored regions be formed at the positions where the pixel electrodes 2 are projected on the transparent support substrate side, and the colored regions be formed with an area ratio of 90% or less to the pixel electrodes 2.

On the other hand, in the passive system or the segment system, the charged particles move in the common regions which are sandwiched between the patterned pixel electrodes and the electrically conductive layer, and therefore these common regions are suitably considered to be the pixel aperture portions. That is, it is preferred that the colored regions 13 on the color filter side be formed with an area ratio of 90% or less to the area of the pixel aperture portions. Moreover, although depending on the use and required characteristics of the display device, in order to perform the desired color characteristics, even when the pixel electrodes are concerned or the pixel aperture portions are concerned, it is preferred that the area ratio occupied by the colored regions be 30% or more, and more preferably 40% or more. When the area ratio is lower than this range, in order to obtain the desired color characteristics, the colored layers forming the colored regions need to be thickened, or the density of the pigment in the colored layers needs to be increased. Alternatively, the desired color characteristics cannot be displayed. Note that, in the color filter, by forming the portions other than the colored regions as colorless regions, the used amount of coloring ink can be decreased, and a bright color display element can be realized.

As described above, by setting the area of the colored regions in a single pixel portion of the color filter to 90% or less to the pixel electrodes, or 90% or less to the pixel aperture portions, the allowable range of the alignment accuracy at the time of bonding the drive-side substrate and the color filter with each other can be enlarged, thereby contributing to enhancement of the yield rate. Particularly, when the film substrate is used as the support substrate, enhancement of the yield rate can be achieved with respect to the change of the film size when the film is bonded.

In this manner, when the colored area S in the colored regions, which form a single pixel portion of the color filter, is formed by an inkjet method, it is preferred to use a contact area $a_0$ as a reference, which is formed when a single liquid droplet is ejected in advance from the inkjet nozzle to the transparent support substrate and dried. That is, when the colored area S is greater than the contact area $a_0$, a plurality of liquid droplets can be used for drawing a single colored region, and the liquid droplets can be overlapped, isolated, or combined with each other. Further, when a single colored region is drawn with a plurality of liquid droplets, although its state of being combined varies depending on the time differences of landing among the liquid droplets the inkjet drawing method is not limited to the method described herein.

Regarding the coloring inks for forming the colored regions, as long as the liquid droplets can be continuously ejected from the inkjet head under a stable state, any publicly known materials can be chosen as the composition ingredients, and the chosen ink can be used by being adjusted to proper ink physical properties as described later. Regarding such composition ingredients, an ultraviolet curing or thermosetting resin is dissolved as a main component in a colorless solvent having a boiling point of 200° C. which is suitable for inkjet continuous ejection. Further, an organic pigment, which is minutely dispersed into 100 nm or less and stabilized, is suitably used as the coloring ingredient.

Moreover, in the color display element of the present invention, the coloring pattern, which is formed by the colored regions on the color filter, is not specifically limited, and an appropriate shape can be suitably used. For example, when the respective pattern shapes are substantially rectangular, square, or circular, it may be possible that three kinds of patterns are repeatedly arranged, and an "L" arrangement, a triangular arrangement, further, a mosaic arrangement or a random arrangement may be possible. Moreover, a plurality of coloring patterns may be combined with a transparent pattern. Comparing to the producing method of the color filter which uses the colored photoresist, the inkjet method has a feature that a variety of patterns can be chosen without preparing a photo mask. Further, in multicolor expressions of four or more colors, there is no need for repeating the photolithography steps multiple times so as to be advantageous in view of the costs. Note that, the term "colorless" as used herein means a state in which the coloring pattern is not formed on the transparent support substrate. That is, it means a state in which no printing is performed by the inkjet method, and to make the portions other than the colored regions transparent means a formation of transparent pixels (which correspond to the white color as the display) by means of the inkjet method by using coloring ink which does not include pigment or includes colorless pigment.

In order to apply the coloring inks to a desired colored region of a single pixel on the transparent support substrate, the following means are effective with regard to the materials and the application of ink. As one means, (1) it is preferred that a cleaning or surface treatment, which makes the surface property of the transparent support substrate uniform, be performed in order that the coloring ink, which has been ejected by the inkjet method, spreads constantly at any portion on the transparent support substrate. Moreover, (2) it is preferred that the transparent support substrate be heated so that the evaporative ingredients in the coloring ink is vaporized immediately after the landing of the liquid droplet, thereby preventing the liquid droplet from spreading. Further, it is preferred that the colored ink be provided with ultraviolet curability, at least ultraviolet exposure be performed after performing the inkjet application on the transparent support substrate and drying, and the pattern region be prevented from spreading in the subsequent heat treatment process.

That is, in order to produce a color filter which has in-plane uniformity, it is desired that a cleaning or surface treatment be performed to the transparent support substrate, thereby making uniform the contact angle of the coloring ink with respect to the support substrate. For example, cleaning by a publicly known alkaline detergent, an atmospheric pressure plasma method, corona discharge, an ultraviolet treatment, preliminary application of a fluorine ink-repellent agent, a silane coupling treatment, and the like may be available. This is because the ink, which has landed on the support substrate, is in a liquid state, and hence the contact angle is determined by the surface tension thereof and the wettability with respect to the substrate, and the spread diameter is determined by the amount of liquid droplet.

Moreover, in order to actively control the spread diameter of the coloring ink, it is also a preferred method that the transparent support substrate is heated so that the evaporative ingredients in the coloring ink is vaporized immediately after the landing of the liquid droplet, thereby preventing the liquid droplet from spreading. Moreover, when the transparent support substrate is formed by an organic film, such as PET or PC, a hard coat layer or the like, which is applied for the purpose of adding a function, may be used for controlling the wettability with respect to the coloring ink.

Further, it is also an effective method for obtaining a uniform color filter that the coloring ink is provided with ultraviolet curability, at least ultraviolet exposure is performed after performing the inkjet application on the transparent support substrate and drying, and the pattern region is prevented from spreading in the subsequent heat treatment process. Publicly known means can be used as the means for providing ultraviolet curability to the coloring ink. For example, there is a method in which a liquid acrylic monomer and a photoinitiator are added to the ink, and curing with an ultraviolet ray is performed thereto.

Nothing is formed on the portions other than the colored regions (which include the transparent regions formed with the transparent ink including no pigment by means of the inkjet method for the purpose of forming the transparent pixels, if any), so as to obtain the color filter. The thus obtained color filter is bonded to the transparent substrate, which is positioned on the viewing side between the opposing substrates, together with an adhesive and the like. Further, regarding the thus formed color filter, in order to flatten the colored regions, a transparent overcoat layer may be preliminary provided.

Note that, an operation principle of the color display element of the present invention is, for example, as follows. That is, in the color display element in which, between the pair of substrates at least one of which is provided with the color filter, the micro capsules in which the white electrophoresis particles and the black electrophoresis particles are dispersed in the transparent dispersion media and enclosed, or the rotational particles which have the white and black surface regions, are disposed, when an electric field having a direction which is positive on the color filter side is applied to the electrophoresis particles or the rotational particles, if the white electrophoresis particles or the white regions of the rotational particles are negatively charged, the white electrophoresis particles move to the color filter side, or the white regions of the rotational particles change their directions with rotations, and therefore, the light from the observation side is reflected by the particles, and transmits through the opposing colored pattern, thereby performing a color display of its colored pattern. On the contrary, when an electric field having a direction which is negative on the color filter side is applied to the electrophoresis particles or the rotational particles, the black electrophoresis particles move to the color filter side, or the black regions of the rotational particles change their directions with rotations, and therefore, the light from the observation side is absorbed so that a color display is not performed. In this manner, by suitably choosing and controlling the direction of electric field which is applied to the electrophoresis particles or the rotational particles, a given color display can be performed.

Advantageous Effects of Invention

According to the color display element of the present invention which is configured as described above, bright color electronic paper can be realized. Moreover, the color display element of the present invention can contribute to decreasing the number of steps and the used amount of materials when producing a color filter.

Further, the color display element of the present invention can contribute to weight saving and thinning of the electronic paper by using the organic film for the transparent support substrate. Moreover, the color display element of the present invention is expected to be used as simplified colorizing means which is only bonded to the conventional monochrome type electronic paper.

DESCRIPTION OF EMBODIMENTS

In the following, examples are described as embodiments of the present invention and the present invention is specifically described. However, the present invention is not limited to these examples. Further, unless otherwise noted, "part (s)" refers to part (s) by weight.

EXAMPLES

Preparation of Coloring Inkjet Ink (R1: Red, G1: Green, B1: Blue)

By using fine pigments for a color filter shown in Table 1 in the coexistence of a polymeric dispersant, dispersion liquids of red, green, and blue were prepared by performing dispersion in a bead mill with diethylene glycol monoethyl ether acetate as a solvent. Based on these dispersion liquids, mixture was performed according to the compositions shown in Table 1. The mixture was subjected to pressure filtration by means of a micro filter of 1 μm, and various coloring inkjet inks were prepared. Physical properties thereof are also shown in Table 1.

TABLE 1

| Ingredient of ink | R1 | G1 | B1 |
|---|---|---|---|
| PET30 | 19.5 parts | 16.0 parts | 19.1 parts |
| EGDAC | 25.4 parts | 26.4 parts | 25.3 parts |
| KMB-5103 | 0.38 parts | 0.35 parts | 0.38 parts |
| Irgacure907 | 2.5 parts | 2.1 parts | 2.5 parts |
| BYK-330 | 0.05 parts | 0.05 parts | 0.05 parts |
| PR254 | 1.3 parts | — | — |
| PY150 | 0.3 parts | — | — |
| PG36/PY150 = 50/50 | — | 3.2 parts | — |
| PB15:6 | — | — | 1.9 parts |
| Dispersant | 0.9 parts | 1.5 parts | 1.0 part |
| Solid content (wt %) | 49.5 | 46.7 | 49.6 |
| Viscosity (mPa · sec, 23° C.) | 17.3 | 22.5 | 19.2 |
| Surface tension (mN/m, 23° C.) | 23.6 | 23.6 | 23.7 |

Preparation of Coloring Inkjet Ink (R2: Red, G2: Green, B2: Blue)

By using fine pigments for a color filter shown in Table 2 in the coexistence of a polymeric dispersant, dispersion liquids of red, green, and blue were prepared by performing dispersion in a bead mill with diethylene glycol monoethyl ether acetate as a solvent. Based on these dispersion liquids, mixture was performed according to the compositions shown in Table 2. The mixture was subjected to pressure filtration by means of a micro filter of 1 μm, and various coloring inkjet inks were prepared. Physical properties thereof are also shown in Table 2.

TABLE 2

| Ingredient of ink | R2 | G2 | B2 |
|---|---|---|---|
| Resin ingredients in V-259ME | 10.6 parts | 10.2 parts | 10.7 parts |
| PGMEA | 8 parts | 7.8 parts | 8.2 parts |
| DPHA | 7 parts | 6.8 parts | 7.1 parts |
| YX4000HK | 1.8 parts | 1.7 parts | 1.8 parts |
| Irgacure907 | 1.0 part | 1.0 part | 1.0 part |
| S510 | 0.5 parts | 0.5 parts | 0.5 parts |
| BYK-330 | 0.03 parts | 0.03 parts | 0.03 parts |
| EGDAC | 75 parts | 75 parts | 78 parts |
| PR254 | 1.5 parts | — | — |
| PY150 | 0.4 parts | — | — |
| PG36/PY150 = 50/50 | — | 2.8 parts | — |
| PB15:6 | — | — | 2.0 parts |
| Dispersant | 1.1 parts | 1.3 parts | 1.0 part |
| Solid content (wt %) | 22.3 | 22.6 | 21.1 |
| Viscosity (mPa·sec, 23° C.) | 10.2 | 10.5 | 10.1 |
| Surface tension (mN/m, 23° C.) | 25 | 25 | 25 |

Note that, abbreviations in Table 1 and Table 2 represent as follows.

"PET30": tetramethylolpropane triacrylate (manufactured by NIPPON KAYAKU Co., Ltd.)
"EGDAC": diethylene glycol monoethyl ether acetate (manufactured by Daicel Corporation)
"KMB-5103": 3-acryloxypropyltrimethoxysilane (manufactured by Shin-Etsu Chemical Co., Ltd.)
"Irgacure907": 2-methyl-1-[4-(methylthio)phenyl]-2-morpholinopropan-1-one (manufactured by Chiba Japan K.K.)
"BYK-330": polyether-modified polydimethylsiloxane-based surfactant (manufactured by BYK-Chemie GmbH)
"PGMEA": propylene glycol monomethyl ether acetate
"DPHA": mixture of dipentaerythritol propane hexaacrylate and pentaacrylate (manufactured by NIPPON KAYAKU Co., Ltd.)
"YX4000HK": tetramethyl biphenyl epoxy resin (manufactured by Japan Epoxy Resins Co., Ltd.)
"5510": 3-glycidoxypropyltrimethoxysilane (Sila-Ace S-510 manufactured by CHISSO CORPORATION)
"PR254": C.I. Pigment Red 254
"PY150": C.I. Pigment Yellow 150
"PG36/PY150=50/50": co-dispersion of C.I. Pigment Green 36 and C.I. Pigment Yellow 150
"PB15:6": C.I. Pigment Blue 15:6

Moreover, regarding the physical properties shown in Table 1 and Table 2, the ink viscosities were measured by using an E-type viscometer at 23° C. Moreover, the ink surface tension was measured based on a buoyancy method with a platinum plate by using CBVP-Z (manufactured by Kyowa Interface Science Co., LTD.) at 23° C. Further, regarding the surface shape and size of the colored pixels described later, the filled state just after drawing was measured by using an optical microscope, and the shape was measured by using an optical interferometric profiler WYCO NT 1100 (manufactured by Veeco Instruments Inc.).

In Examples 1 to 8, the size of a single pixel was hereunder set to 151 μm×153 μm, and color filters corresponding to 6-inch panels of 600×800 pixels were produced. Then, these color filters were bonded to the transparent substrate sides of monochrome display electronic books Kindle of electrophoresis type (D701, manufactured by Amazon Inc.), which use the micro capsules, so as to obtain the color display elements. In this monochrome display electronic book, of the pair of opposing substrates, the size of a pixel electrode 2 (size of a pixel aperture portion) on a TFT substrate, which is used for the drive-side, is 131 μm×133 μm.

Example 1

Figure 3:
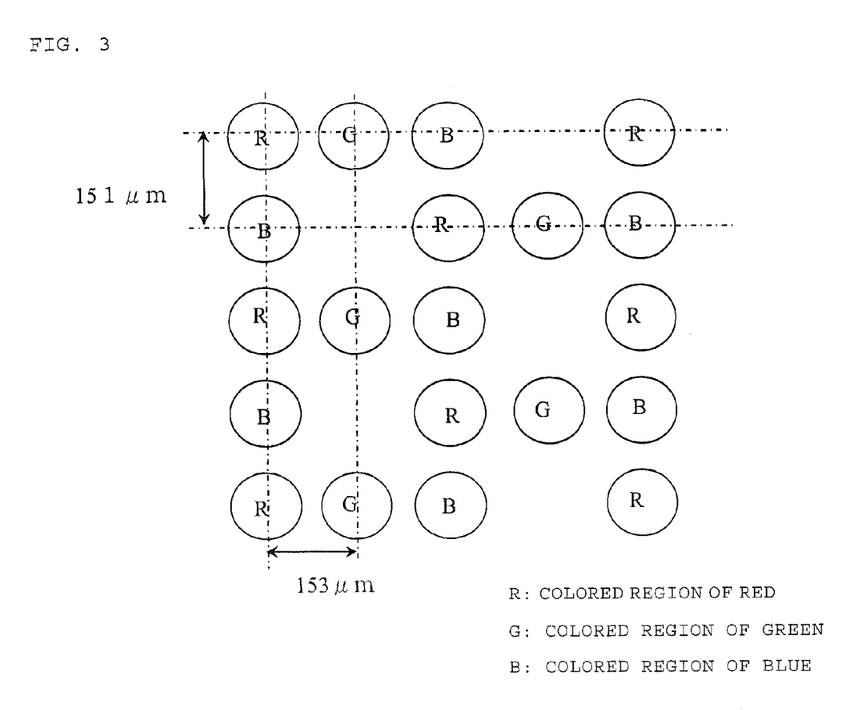
FIG. 3 A schematic view illustrating a drawing pitch of coloring ink which forms colored regions in Example 1.
Figure 5:
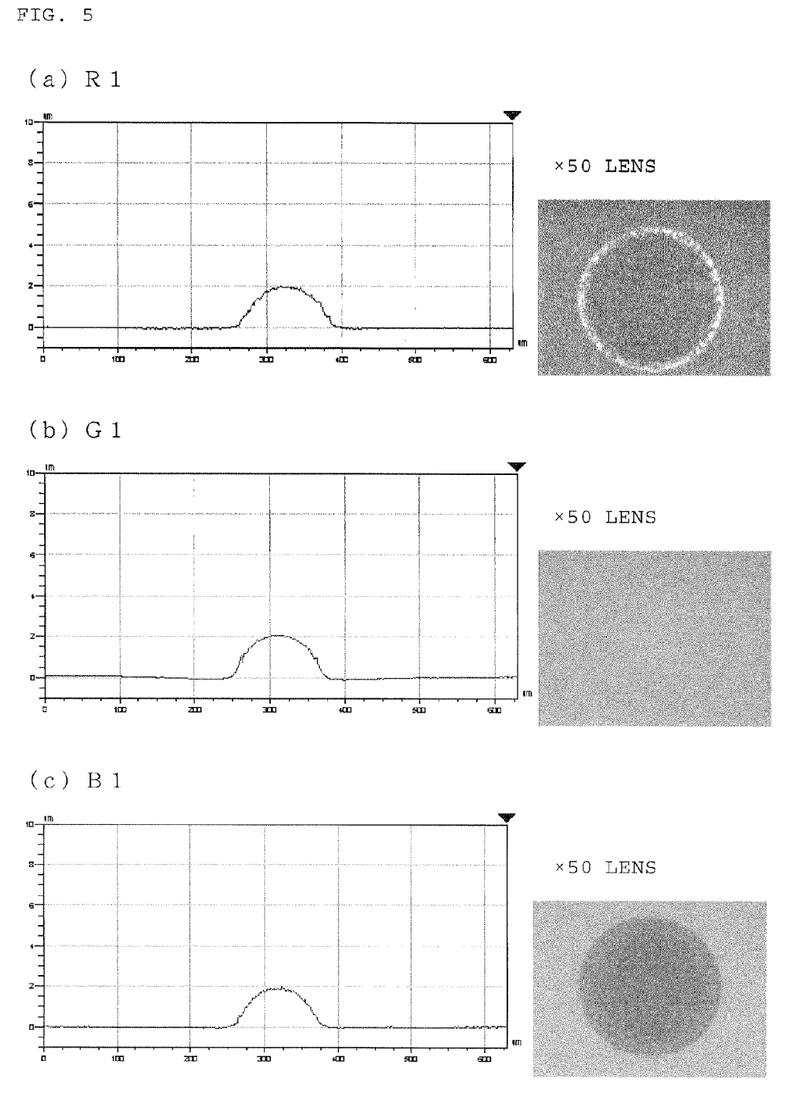
FIG. 5 Explanatory diagrams showing states obtained by measuring diameters and heights of respective droplets which are obtained by sintering at 140° C. for 30 minutes after baking in Example 1.

By using an inkjet head KM512L manufactured by Konica Minolta Corporation (provided with 512 nozzle holes capable of ejecting 42 pl), the above-mentioned coloring inkjet inks R1, G1, and B1 were ejected to draw on a PET film for an inkjet (model number GT701#130) manufactured by TOYOBO Co., LTD., as a transparent support substrate, with the pitch shown in FIG. 3. The colored regions were obtained, and a color filter of a 6-inch size was produced. After drawing, the color filter was dried on a hot plate at 80° C. for 3 minutes, and was exposed by an ultraviolet exposure machine at 1,500 mJ (I ray standard). Further, the color filter was sintered at 140° C. for 30 minutes. The diameters and heights of respective liquid droplets in the processing stage were measured. No overlapping of three colors was found at all, and convex shapes were exhibited as shown in Table 3. Any of the areas of the colored regions was 90% or less to pixel electrodes on the TFT substrate.

TABLE 3

| | | Example 1 | | |
|---|---|---|---|---|
| Kind of substrate | | GT701-#130 | ← | ← |
| Kind of ink | | R1 | G1 | B1 |
| Solid content | % | 49.5 | 46.7 | 50 |
| Viscosity | mPa·s | 17.3 | 22.5 | 19.2 |
| Surface tension | mN/m | 23.6 | 23.6 | 23.7 |
| IJ ejection conditions | | | | |
| Ejection volume | pl | 42 | 42 | 42 |
| Ejection voltage | V | 18.2 | 17.9 | 18.6 |
| Dot diameter after IJ ejection | μm | 122.9 | 112.6 | 122.8 |
| Dot height | μm | 4.3 | 4.9 | 5.3 |
| Contact angle θ/2 method | ° | 8.0 | 9.9 | 9.8 |
| Dot diameter after drying | μm | 122.0 | 111.7 | 120.5 |
| Dot height after IJ ejection | μm | 2.4 | 2.4 | 2.5 |
| Dot diameter after exposure | μm | 121.8 | 110.3 | 119.8 |
| Dot height | μm | 2.3 | 2.2 | 2.4 |
| Dot diameter after baking | μm | 121.8 | 110.4 | 120.2 |
| Dot height | μm | 2.1 | 2.1 | 1.9 |
| After baking After 140° C. × 30 min | | FIG. 5(a) | FIG. 5(b) | FIG. 5(c) |
| Ratio of colored portions (131 μm × 133 μm pixel electrode standard) | % | 67 | 55 | 65 |

Example 2 and Example 3

Color filters were produced similarly to Example 1, except that each of the coloring inks was ejected with two droplets for drawing two times at the same position (Example 2), or ejected with three droplets for drawing three times at the same position (Example 3) so as to overlap at the same dot position of Example 1 (Table 4). It was found that none of the colors overlapped, convex shapes were exhibited, and the height became higher as the number of droplets increased. Moreover, any of the areas of the colored regions was 90% or less to the pixel electrodes on the TFT substrate.

TABLE 4

|  |  | Example | | | | | |
|---|---|---|---|---|---|---|---|
|  |  | 2 | | | 3 | | |
| Kind of substrate |  | GT701-#130 | ← | ← | ← | ← | ← |
| Kind of ink |  | R1 | G1 | B1 | R1 | R1 | B1 |
| Number of liquid droplets |  | 2 | 2 | 2 | 3 | 3 | 3 |
| After landing | Diameter | 122.2 μm | 115.4 μm | 124.3 μm | 124.0 μm | 116.2 μm | 125.2 μm |
|  | Height | 10.4 μm | 11.0 μm | 11.3 μm | 15.8 μm | 15.7 μm | 17.1 μm |
| After drying | Diameter | 121.9 μm | 111.6 μm | 119.5 μm | 124.2 μm | 112.4 μm | 120.8 μm |
|  | Height | 4.7 μm | 5.0 μm | 5.0 μm | 6.6 μm | 7.3 μm | 7.4 μm |
| After exposure | Diameter | 121.8 μm | 109.5 μm | 119.5 μm | 124.5 μm | 110.5 μm | 120.4 μm |
|  | Height | 4.6 μm | 4.7 μm | 4.8 μm | 6.2 μm | 6.9 μm | 7.0 μm |
| After baking | Diameter | 120.7 μm | 111.6 μm | 120.8 μm | 122.2 μm | 113.0 μm | 120.8 μm |
|  | Height | 3.9 μm | 4.0 μm | 3.9 μm | 5.7 μm | 6.2 μm | 6.0 μm |
| Ratio of colored portions (131 μm × 133 μm standard) |  | 66% | 56% | 66% | 67% | 58% | 66% |

Example 4

Color filters of 6-inch size were produced similarly to Example 1, except that a non-alkali glass plate (AN-100 manufactured by ASAHI GLASS Co., LTD.) having a thickness of 0.7 mm was used as the transparent support substrate (Table 5). It was found that the colored pixels were formed while none of the colors overlapped. Moreover, any of the areas of the colored regions was 90% or less to the pixel electrodes on the TFT substrate.

TABLE 5

| Example 4 Kind of substrate | | | | |
|---|---|---|---|---|
|  |  | AN100 | AN100 | AN100 |
| Kind of ink | | | | |
|  |  | R1 | G1 | B1 |
| Number of liquid droplets | | | | |
|  |  | 1 | 1 | 1 |
| After landing | Diameter | 132.05 μm | 122.84 μm | 132.57 μm |
|  | Height | 3.695 μm | 4.21 μm | 3.885 μm |
| After drying | Diameter | 135.06 μm | 120.47 μm | 131.73 μm |
|  | Height | 1.26 μm | 1.52 μm | 1.38 μm |
| After exposure | Diameter | 135.31 μm | 119.78 μm | 131.26 μm |
|  | Height | 1.16 μm | 1.43 μm | 1.25 μm |
| After baking | Diameter | 134.58 μm | 120.17 μm | 130.25 μm |
|  | Height | 1.14 μm | 1.41 μm | 1.23 μm |
| Ratio of colored portions (131 μm × 133 μm pixel electrode standard) |  | 82% | 65% | 77% |

Example 5

By using an inkjet head KM216 manufactured by Konica Minolta Corporation (provided with 216 nozzle holes capable of ejecting 15 pl), the above-mentioned coloring inkjet inks R2, G2, and B2 were ejected to draw drop by drop independently on a PET film for an inkjet (model number GT701#130) manufactured by TOYOBO Co., LTD., as a transparent support substrate. Their spread diameters were 65 to 70 μm. Regarding the drawing conditions, simultaneous printings of three colors were performed under the following conditions. An ejection failure at the nozzles was not found during the printing, and a good continuous ejection characteristic was exhibited.

Figure 4:
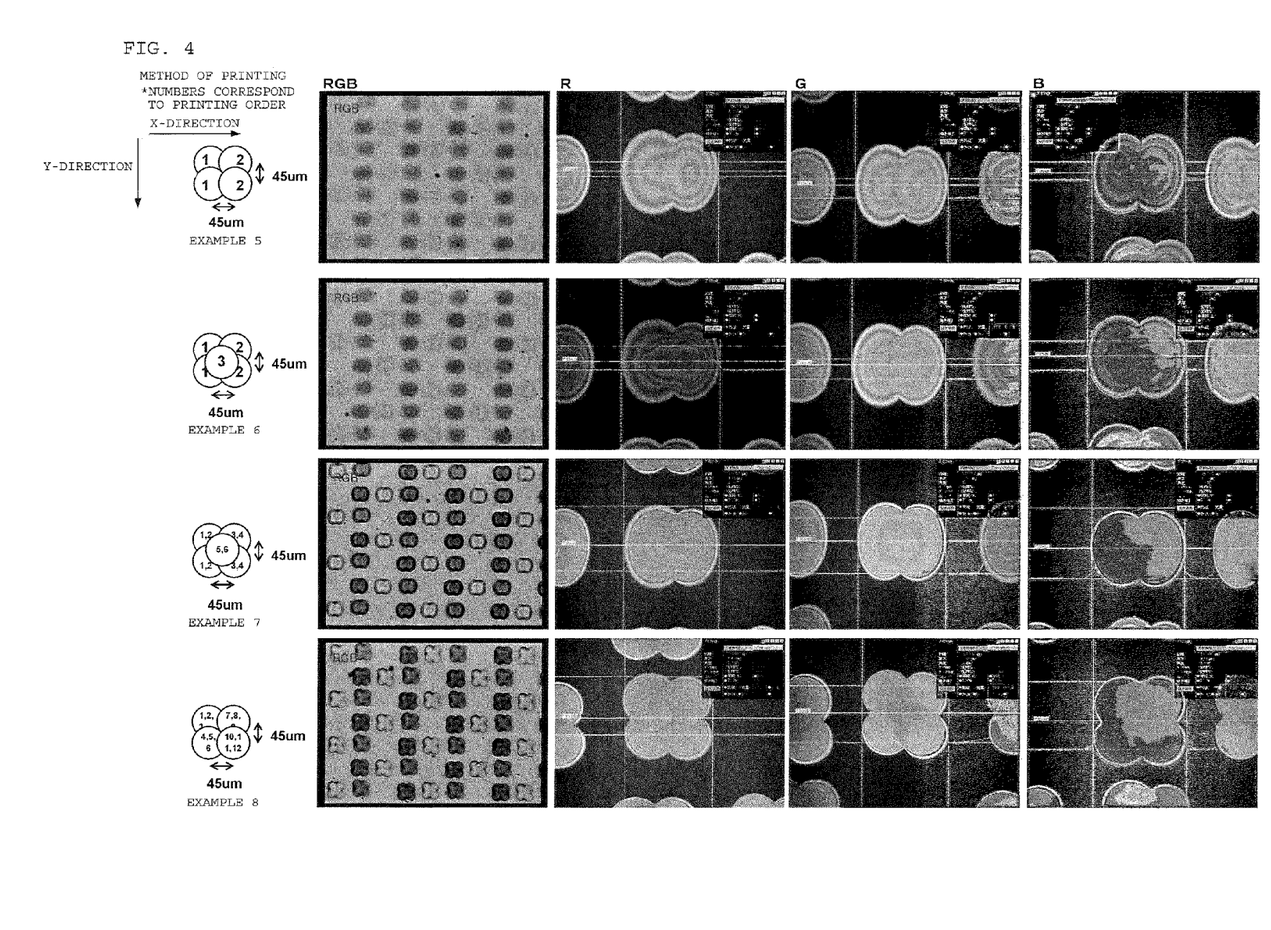
FIG. 4 A diagram illustrating drawing positions and their shapes of coloring ink which forms colored regions in Examples 5 to 8.

Jetting Speed: 4.1 m/s
Printing Speed: 305 mm/s
Volume of Liquid Droplet: 15 μl/droplet Next, as illustrated in FIG. 4, the first drawing was performed with two droplets which were spaced apart from each other by 45 μm between the centers thereof. The first drawing was performed with a pitch of 302 μm in the drawing direction (Y-direction), and a pitch of 306 μm in the X-direction. Further, 5 seconds later, the second drawing was performed with similarly arranged two droplets, the centers of which were spaced apart from each other by 45 μm in the X-direction from the centers of the two droplets formed in the first drawing. As a result, four droplets in total overlapped so as to form a colored region in a single pixel. The colored regions were formed by performing drawing with respective three colors with a pitch of 302 μm×306 μm so as to obtain a pixel size similar to that of FIG. 2. After drawing, drying was performed at 80° C. for 3 minutes, and exposure was performed at 1,500 mJ by an ultraviolet exposure machine. Further, heat treatment was performed at 80° C. for 60 minutes, thereby producing a color filter. FIG. 4 shows images of photomicrographs of the obtained color filter, and surface profile diagrams by optical interference. Table 6 shows sizes and heights of the obtained colored pixels. The pixels in the respective colors were independent from each other without being combined with each other. Moreover, regarding the size of a single colored pixel, as shown in Table 7, any of the areas of the colored regions was 906 or less to the pixel electrodes on the TFT substrate.

TABLE 6

| | Size of colored pixel | | | | | | | | |
|---|---|---|---|---|---|---|---|---|---|
| | Red | | | Green | | | Blue | | |
| Example | Width [μm] | Length [μm] | Height [μm] | Width [μm] | Length [μm] | Height [μm] | Width [μm] | Length [μm] | Height [μm] |
| 5 | 124.4 | 110.1 | 0.65 | 120.3 | 106.3 | 0.87 | 120.3 | 103.7 | 0.8 |
| 6 | 126.1 | 109 | 1.05 | 120.3 | 106 | 0.91 | 127 | 102.8 | 1.3 |
| 7 | 119.5 | 103.7 | 3.01 | 112.2 | 98.8 | 2.51 | 120.6 | 97.9 | 3.37 |
| 8 | 113.6 | 113.6 | 3.43 | 111.9 | 111.9 | 2.92 | 120.9 | 120.9 | 3.58 |

TABLE 7

| Ratio of colored portions (%) 131 μm × 133 μm pixel electrode standard | | | |
|---|---|---|---|
| Example | Red | Green | Blue |
| 5 | 79% | 73% | 72% |
| 6 | 79% | 73% | 75% |
| 7 | 71% | 64% | 68% |
| 8 | 74% | 72% | 84% |

Examples 6 to 8

As illustrated in FIG. 4, regarding Example 6, drawing of Nos. 1 and 2 illustrated in FIG. 4 was performed similarly to Example 5, and further, the third drawing (No. 3) was performed so as to apply a single droplet to the portion of the center of gravity of the four droplets, thereby forming a colored region in a single pixel, namely, five droplets in total were used for the drawing. Regarding Example 7, the same drawing pattern as that of Example 6 was repeated two times so that a single colored pixel was formed with drawing of six times in total and six liquid droplets in total. On the other hand, regarding Example 8, drawing was performed with a single droplet in the drawing direction with a pitch of 302 μm, and further, drawing was repeated three times in total at the same position. Next, drawing was performed three times in total at the same position with a similar pitch while being shifted by 42 μm in the drawing Y direction. Further, drawing was performed three times at the same position while being shifted by 45 μm in the X direction with respect to the first drawing. Next, drawing was performed three times while being shifted by 45 μm in the drawing Y direction. That is, a single colored pixel was formed with drawing of twelve times and twelve droplets. Note that, the arrangement of the respective colors was made as illustrated in FIG. 3. In the thus formed color filter, the colored pixels in the respective colors were independent from each other without being combined with each other. Moreover, any of the areas of the colored regions corresponding to the size of a single colored pixel was 90% or less to the pixel electrodes on the TFT substrate.

Example 9

The color filters, which had been obtained in the above-mentioned Examples 1 to 8, were bonded via an acrylic transparent adhesive to 6-inch electronic paper panels of 600×800 pixels whose pitch of a single pixel was 151 μm×153 μm (the pixel electrode size of the TFT substrate was 131 μm×133 μm), thereby producing color display elements. When the pixels of respective colors were turned on, no mixture of colors was found among the colored pixels. Moreover, comparing to the reflectance, which was considered to be 100%, of the monochrome display to which the color filters were not bonded yet, it was confirmed that any of the reflectance of the colored display elements exceeded 60% and bright panels were obtained.

Comparative Example 1

A resin black matrix was formed on non-alkali glass having a thickness of 0.7 mm by photolithography so that each of the colored portions was 131 μm×133 μm and a colored pattern of red, green, blue, and white similarly to FIG. 1 was obtained. At this time, the black matrix had a film thickness of 2 μm and an optical density OD of 4, and had surface ink repellency. In this resin black matrix, R2, G2, and B2 inks and a photosensitive transparent resin ink were filled by an inkjet with a colored pattern similar to FIG. 1 so as to produce a 6-inch color filter whose film thickness was 1.8 μm after being cured.

This color filter was bonded onto a 6-inch electronic paper panel of 600×800 pixels whose size of one pixel was 151 μm×153 μm (the pixel electrode size of the TFT substrate was 131 μm×133 μm) so as to produce a color display element. Comparing to the reflectance of the monochrome display to which the color filter was not bonded yet, the reflectance of the color display element was less than 50 and the brightness was insufficient for a panel.

Comparative Example 2

A PET film A4100 manufactured by TOYOBO Co., LTD. (thickness of 125 μm) was cut into a 7-inch size, and was bonded onto a glass substrate. Then, transparent partition walls having a film thickness of 2 μm were formed with a transparent photosensitive resin composition by photolithography so that the colored region became 131 μm×133 μm. The photosensitive resin composition has a component of a fluorine-containing oligomer, and hence the surfaces of the obtained partition walls have ink repellency. In the partition walls, photosensitive transparent resin inks of R2, G2, and B2 inks were filled by an inkjet similarly to Comparative Example 1 so as to produce a 6-inch color filter whose film thickness was 1.8 μm after being cured.

This film color filter was bonded onto a 6-inch electronic paper panel of 600×800 pixels having a pixel pitch of 151 μm×153 μm (the pixel electrode size of the TFT substrate was 131 μm×133 μm) so as to produce a color display element. When turning on the pixels of respective colors, it was found that mixture of colors between the colored pixels partially occurred.

REFERENCE SIGNS LIST

1: pixel switch
2: pixel electrode
3: drive-side substrate

4: electrically conductive layer
5: transparent substrate
6: white particle
7: black particle
8: dispersion medium
9: micro capsule
10: display medium
11: color filter
12: substrate
13: partition wall
14: pixel region
15: colored layer
16: wiring

The invention claimed is:

1. A method of producing a color display element including a pair of opposing substrates having electrodes, charged display bodies of white color and black color which are enclosed between the opposing substrates, and a color filter which is disposed on one of the opposing substrates, the method comprising forming a color filter disposed on a viewing, side by forming, first, colored regions of at least three colors of blue, green, and red by an inkjet method on a transparent support substrate, and forming remaining regions other than the colored regions so as to be colorless or transparent, wherein one of the opposing substrates is a drive-side substrate on which pixel electrodes are formed in a given pattern, the colored regions are disposed at positions where the pixel electrodes are projected on the transparent support substrate side, and the colored regions are formed with an area ratio of 90% or less to the pixel electrodes.

2. A method of producing a color display element according to claim 1, wherein the forming of the colored regions by the inkjet method comprises providing ultraviolet curability to coloring inks, applying the coloring onto the transparent support substrate by the inkjet method, and performing at least ultraviolet exposure to the coloring inks after drying.

3. A reflection type color display element, which is obtained by the producing method according to claim 1, the reflection type color display element comprising the color filter and being configured to optionally switch charged white particles and a black state in a micro capsule.

4. A color display element according to claim 3, wherein the transparent support substrate in the color filter is made of a transparent film.

5. A reflection type color display element, which is obtained by the producing method according to claim 2, the reflection type color display element comprising the color filter and being configured to optionally switch charged white particles and a black state in a micro capsule.

6. A color display element according to claim 5, wherein the transparent support substrate in the color filter is made of a transparent film.

7. A method of producing a color display element according to claim 1, wherein the color filter is formed without forming a partition wall and a shading portion which corresponds to the black matrix.

* * * * *